: US007330523B2

United States Patent
Young

(10) Patent No.: US 7,330,523 B2
(45) Date of Patent: Feb. 12, 2008

(54) ESTIMATING FREQUENCY OFFSET

(75) Inventor: Robert William Young, Burwell (GB)

(73) Assignee: Cambridge Silicon Radio Ltd., Cambridge (GB)

( * ) Notice: Subject to any disclaimer, the term of this patent is extended or adjusted under 35 U.S.C. 154(b) by 466 days.

(21) Appl. No.: 10/468,547

(22) PCT Filed: Feb. 15, 2002

(86) PCT No.: PCT/GB02/00683

§ 371 (c)(1),
(2), (4) Date: Jan. 26, 2004

(87) PCT Pub. No.: WO02/067520

PCT Pub. Date: Aug. 29, 2002

(65) Prior Publication Data

US 2004/0114697 A1    Jun. 17, 2004

(30) Foreign Application Priority Data

Feb. 21, 2001  (GB) ................................. 0104280.3

(51) Int. Cl.
*H04L 27/152* (2006.01)
*H04L 27/144* (2006.01)
*H04L 27/00* (2006.01)

(52) U.S. Cl. ...................... 375/350; 375/316; 375/340; 375/344; 375/224; 375/285; 455/307; 455/296; 455/309

(58) Field of Classification Search ................ 375/350, 375/316, 340, 344, 224, 285; 455/307, 296, 455/309
See application file for complete search history.

(56) References Cited

U.S. PATENT DOCUMENTS

| 5,539,355 | A | | 7/1996 | Nakamura | |
|---|---|---|---|---|---|
| 5,652,541 | A | * | 7/1997 | Yang et al. | 329/300 |
| 5,732,110 | A | | 3/1998 | Richards | |
| 6,081,563 | A | * | 6/2000 | Taga et al. | 375/344 |
| 6,130,921 | A | * | 10/2000 | Powell et al. | 375/344 |
| 6,373,861 | B1 | * | 4/2002 | Lee | 370/503 |
| 6,501,730 | B1 | * | 12/2002 | Katsumoto | 370/208 |
| 7,194,046 | B2 | * | 3/2007 | Borowski et al. | 375/327 |

* cited by examiner

*Primary Examiner*—Chieh M. Fan
*Assistant Examiner*—Aris Fotakis
(74) *Attorney, Agent, or Firm*—Novak Druce DeLuca & Quigg LLP

(57) ABSTRACT

Frequency offset estimation apparatus for estimating the offset from a predetermined centre frequency of an input signal carrying a plurality of frequency shifted symbols, the apparatus comprising: a demodulator for demodulating the input signal to estimate the symbols; a first filter for forming a first estimate of the offset by determining the average of a first predetermined number of the last maxima and minima of the instantaneous frequency difference between the input signal and a signal at the centre frequency; a second filter for forming a second estimate of the offset by determining the average of the values of the instantaneous frequency difference between the input signal at the centre frequency associated with the estimation by the demodulator of those of the symbols having the greatest positive and negative frequency shifts; and selector for selecting the first estimate or the second estimate as an output estimate of the frequency error.

11 Claims, 3 Drawing Sheets

ESTIMATING FREQUENCY OFFSET

CROSS REFERENCE TO RELATED APPLICATION

This application is a 35 U.S.C. §371 National Phase Entry Application from PCT/GB02/00683, filed Feb. 15, 2002, and designating the U.S.

This invention relates to estimating frequency offset or error, for example to permit subsequent correction of the estimated error. The present invention is particularly applicable for correcting error so as to improve the accuracy of demodulation, for example in a radio receiver.

BACKGROUND OF THE INVENTION

FIG. 1 is a schematic diagram of one form of radio receiver. The receiver comprises an antenna 1 connected to an amplifier 2 which amplifies the radio frequency signal received by the antenna. The output of the amplifier is filtered by a bandpass filter 3. The filtered signal, still at radio frequency, is then downconverted by mixing in mixer 4 with a signal generated by oscillator 5. In the receiver of FIG. 1 the mixer 4 downconverts the radio frequency signal down to an intermediate frequency (IF). The intermediate frequency signal is then downconverted to another intermediate frequency or to baseband by mixing in mixer 6 with a signal generated by oscillator 7. Bandpass filters 8 and 9 are used between mixer 4 and mixer 6, and after mixer 6. The IF or baseband signal is passed to demodulator 10 for demodulation to determine the symbol stream encoded in the signal.

One form of modulation is frequency shift keying (FSK). In FSK modulation symbols are encoded into the signal as variations (shifts) in the signal's frequency about a centre frequency. Especially when the signal is modulated using FSK modulation it is important that the received signal as input to the symbol estimator port of the demodulator is not displaced in its centre frequency with respect to the nominal value of the carrier frequency. Otherwise, the possibility of signals being decoded incorrectly is increased. Such a displacement may arise, for example, from errors in the transmission frequency or in the mixing frequencies used in the receiver (e.g. as generated by oscillators 5 and 7).

In order to cope with displacement of the centre frequency of the received signal, the demodulator may estimate the displacement and apply compensation to the signal or adjust the, demodulation process with the aim of avoiding demodulation errors due to the displacement.

SUMMARY OF THE INVENTION

When data is sent to the receiver in bursts, for example as packets, rather than continuously, there are potentially conflicting requirements in the estimation of the displacement of the received signal's centre frequency. At the start of a received packet it would be preferred to average the displacement over a short time period so as to lock quickly on to an estimated value for the displacement and allow the demodulation process to start quickly. This calls for the use of a short time constant filter in the estimation process. As more of the packet is received it would be preferable to average the displacement over a longer time period, so as to reduce noise in the estimation process and give a more accurate estimate of the displacement. This calls for the use of a longer time constant filter.

According to the present invention there is provided frequency offset estimation apparatus for estimating the offset from a predetermined centre frequency of an input signal carrying a plurality of frequency shifted symbols, the apparatus comprising: a demodulator for demodulating the input signal to estimate the symbols; a first filter for forming a first estimate of the offset by determining the average of a first predetermined number of the last maxima and minima of the instantaneous frequency difference between the input signal and a signal at the centre frequency; a second filter for forming a second estimate of the offset by determining the average of the values of the instantaneous frequency difference between the input signal and a signal at the centre frequency associated with the estimation by the demodulator of those of the symbols having the greatest positive and negative frequency shifts; and a selector for selecting the first estimate or the second estimate as an output estimate of the frequency error.

Suitably the first predetermined number is greater than 1. Suitably the first predetermined number is less than 10, and preferably less than 6. The first predetermined number is most preferably 2, 3 or 4.

The second filter may comprise: a first infinite impulse response filter for determining a first average of the values of the instantaneous frequency difference between the input signal and a signal at the centre frequency associated with the estimation by the demodulator of those of the symbols having the greatest positive frequency shifts; a second infinite impulse response filter for determining a second average of the values of the instantaneous frequency difference between the input signal and a signal at the centre frequency associated with the estimation by the demodulator of those of the symbols having the greatest negative frequency shifts; and an averaging unit for determining the average of the first average and the second average.

The filters may be applied to a single instantaneous difference per symbol, corresponding to the sampling time of each symbol, or may be applied to multiple instantaneous differences during each symbol.

The signal may be encoded using only two symbols.

In the case of a modulation scheme using P different frequency deviations where P is greater than two, the second filter may comprise P infinite impulse response filters with each infinite impulse response filter being directed to estimating the instantaneous frequency difference for one of those P symbols. The outputs of the P filters can then be combined and/or selected between to give the estimate of frequency error.

The frequency offset estimation apparatus may comprise a third filter for forming a third estimate of the offset by determining the average of a second predetermined number of the last maxima and minima of the instantaneous frequency difference between the input signal and a signal at the centre frequency. The second filter may be arranged to take the third estimate as an initialisation value for the first and second infinite impulse response filters.

The second predetermined number is preferably greater than the first predetermined number. The second predetermined number is preferably four or more.

Suitably, on receipt of a burst of data the demodulator is arranged to synchronise to the input signal and provide a synchronisation signal indicating whether synchronisation has been achieved.

The second filter may be responsive to the synchronisation signal indicating that synchronisation has been achieved to initialise the first and second infinite impulse response filters.

The selector may be responsive to the synchronisation signal to select the first estimate if the synchronisation signal indicates that synchronisation has not been achieved and to select the second estimate if the synchronisation signal indicates that synchronisation has been achieved.

The demodulator may comprise: a frequency shifting arrangement for shifting the frequency of the input signal by an amount corresponding to the output estimate of the frequency error to generate a frequency shifted signal, and a symbol estimator for estimating the symbols in the frequency shifted signal. Such a shift would be in a direction such as to negate the estimated frequency error in the input signal. Alternatively, the demodulator may comprise a sensor for sensing the instantaneous frequency of the input signal and generating a sensed frequency signal representing the sensed frequency; a frequency shifting arrangement for receiving the sensed frequency signal and forming a frequency shifted signal representing the sensed frequency shifted by an amount corresponding to the output estimate of the frequency error; and a symbol estimator for estimating the symbols in the frequency shifted signal. Alternatively, the demodulator may comprise a symbol estimator for estimating the symbols in the input signal by comparing the instantaneous frequency of the incoming signal with a plurality of frequency thresholds; and a threshold frequency shifting arrangement for shifting the thresholds by an amount corresponding to the output estimate of the frequency error. Such as shift would be in a direction such as to compensate for the estimated frequency error in the input signal.

The frequency offset estimation apparatus may be provided in a radio signal receiver. The radio signal receiver may comprise: frequency offset estimation apparatus as claimed in any preceding claim; an antenna for receiving a radio frequency signal; and downconversion means for downconverting the radio frequency signal to another intermediate frequency or to baseband to form the input signal.

BRIEF DESCRIPTION OF THE DRAWINGS

The present invention will now be described by way of example with reference to the accompanying drawings, in which.

DETAILED DESCRIPTION OF THE INVENTION

Figure 1:
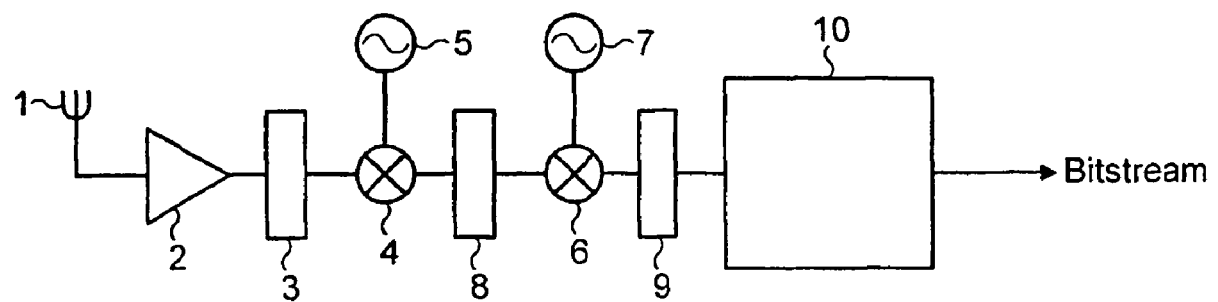
FIG. 1 is a schematic diagram of a radio receiver for FSK signals, which is applicable to the present invention.
Figure 2:
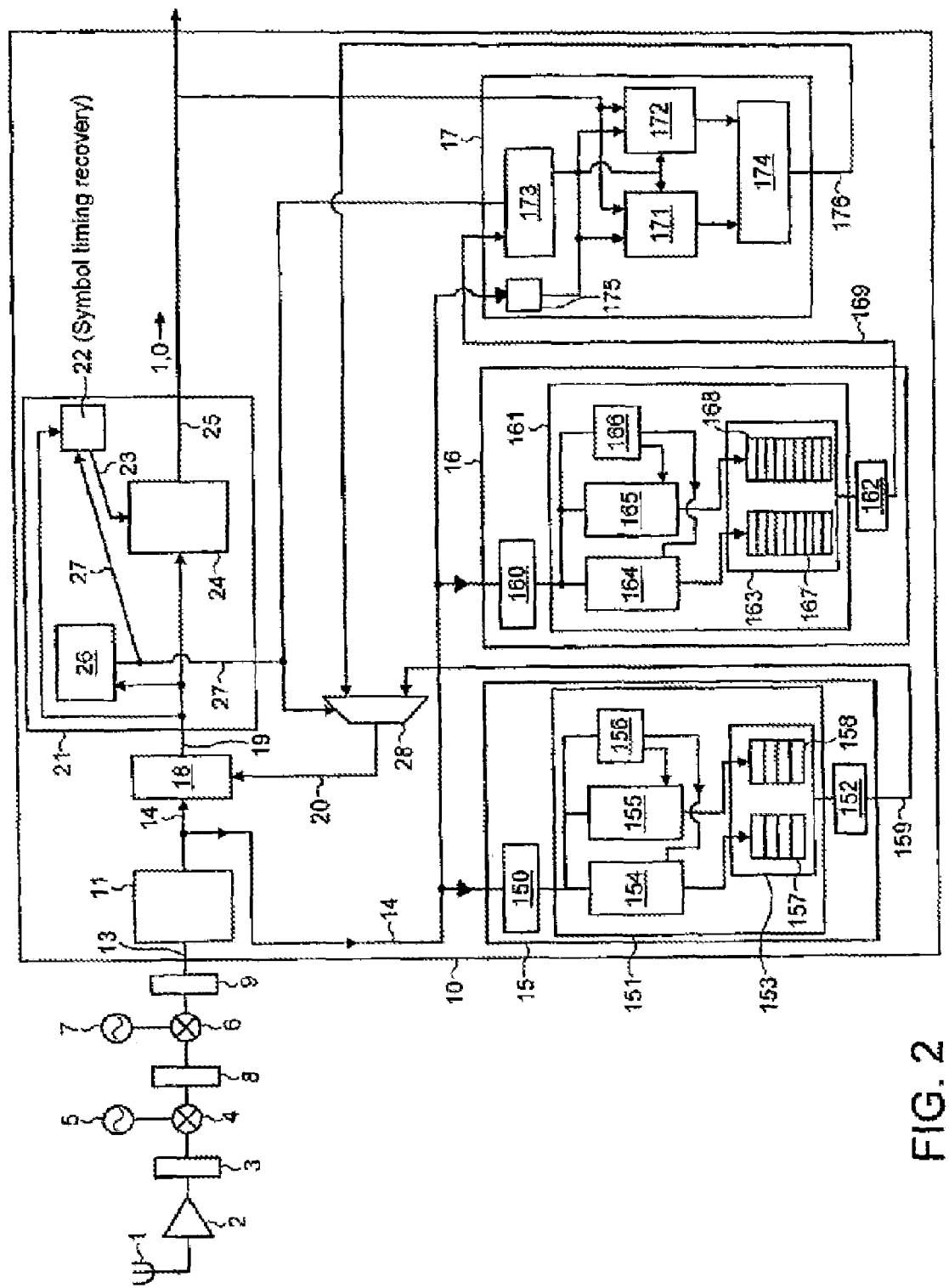
FIG. 2 is a schematic diagram of a radio receiver according to one embodiment of the present invention.

In the receiver of FIG. 2, the antenna 1, filters 2, 8 and 9, mixers 4 and 6 and oscillators 5 and 7 are as described with reference to FIG. 1. Demodulator 10 is of a novel form, as described below.

In the receiver of FIG. 2 a sensor unit 11 is provided for sensing the instantaneous frequency of the signal as input to the demodulator. The input of the sensor unit 11 is connected to the input 13 to the demodulator. The sensor unit 11 could be a frequency discriminator circuit. The sensor unit 11 provides an output at 14 which is indicative of the instantaneous frequency of the signal input to the demodulator.

The output 14 of the sensor unit 11 is applied to three filters 15, 16 and 17. Filter 15 is a short time constant filter. Filter 16 is an intermediate time constant filter. Filter 17 is a longer time constant filter.

The demodulator includes a frequency compensator 18 which applies a frequency compensation to the output from the sensor unit 11 so as to form a compensated signal at 19. The compensation applied by the compensator is dependant on the control signal input to it at 20 from the filters 15, 16, 17.

The output 19 of the frequency compensator is applied to a symbol estimator 24, symbol timing recovery unit 22 and a synchronisation unit 26. The synchronisation unit synchronises the demodulation section 21 to the received signal. The synchronisation unit 26 provides an output at 27 which indicates whether synchronisation has been achieved. The symbol timing recovery unit recovers the timing of symbols in the signal at 19 and provides a corresponding output to the symbol estimator 24. The symbol estimator 24 recovers symbols from the compensated signal at 19 by comparing the frequency represented by the compensated signal with one or more thresholds to establish which symbols are represented by the received signal. The output of the symbol estimator 24 is the symbol stream output from the demodulation section at 25. In this example, the result is provided as one of two symbols represented as a '0' bit or a '1' bit in the output at 25, depending on whether the frequency of the received signal is higher or lower than a threshold. Other modulation schemes including more than two symbols could be used.

In some implementations the frequency estimator 18 could conveniently be integrated with the symbol estimator 24. For example, the symbol estimator could simply compare the output of the frequency sensor 11 with a threshold that is derived from the frequency error estimate 20 in order to determine the symbol value.

When a packet or burst of symbols is begun to be received by the receiver the first symbols of the packet are used by the receiver to synchronise to the packet. In many systems in which data is transmitted in packets each packet begins with a series of symbols that act as an access code to which the receiver can synchronise by means of synchronisation unit 26.

Filter 15 is used to estimate the frequency error before the receiver has synchronised to the access code at the start of each packet. Filter 15 includes a difference unit 150, a maxima/minima unit 151 and an averaging unit 152. Difference unit 150 determines the difference between the output from the sensor unit 11, which indicates the instantaneous frequency of the signal as received, and the nominal carrier frequency. Note that the nominal carrier frequency may correspond to a value of zero, in which case the differencing unit is not required. The difference signal output from difference unit is applied to maxima/minima unit 151. The maxima/minima unit 151 determines the maxima and minima of the difference signal between each zero crossing of the difference signal. When the difference signal goes negative the maxima/minima unit determines its minimum value until it next goes positive. When the difference signal goes positive the maxima/minima unit determines its minimum value until it next goes negative. The maxima/minima unit stores the N last maxima and minima in store 153, where N is a predetermined number. N is suitably relatively small, for example 2, 3 or 4.

In more detail, maxima minima unit includes a maximum register 154, a minimum register 155 and zero crossing detector 156. Maximum register 154 receives the difference signal output from difference unit 150, compares it with a value currently stored in the maximum register and replaces the value currently stored in the maximum register with the value of the difference signal if the difference signal is greater than the value currently stored in the maximum register. Minimum register 155 receives the difference signal output from difference unit 150, compares it with a value currently stored in the minimum register and replaces the value currently stored in the minimum register with the value of the difference signal if the difference signal is less than the value currently stored in the maximum register. Zero crossing detector 156 monitors the difference signal output from difference unit 150 and if it detects that the signal has crossed zero going from positive to negative it stores the value in the maximum register in a maximum section 157 of store 153 and resets the maximum register to zero. If it detects that the signal has crossed zero going from negative to positive it stores the value in the minimum register in a minimum section 158 of store 153 and resets the minimum register to zero. The sections 157 and 158 may be implemented a FIFO (first in, first out) buffers each of length N so that between them they store the last N maxima and minima.

Once N maxima and minima have been stored in store 153 averaging unit 152 determines the mean of those values. That value is output from filter 15 at 159 as an estimate of the frequency error.

The value N is chosen to be fairly small, for example 2, 3 or 4, so that received signal preceding the packet that is being demodulated does not significantly influence the estimate of the frequency error generated by filter 15, and so that the filter 15 can track rapid frequency drift since frequency drift is typically at its worst at the start of each packet. Also, the frequency error estimator must rapidly acquire the error at the start of each packet since the error can be quite large; subsequently it can track drift in the error at a slower rate.

Filter 16 is similar to filter 15. Components 160 to 169 correspond to components 150 to 159 respectively, with the exception that the maximum and minimum store sections 167 and 168 store a greater number M of last maxima and minima, and averaging unit 162 correspondingly averages over the last M maxima and minima as stored in those store sections. M is greater than N. Typical values for M are in the range from 4 to 10. Filter 16 provides more averaging of the frequency error—that is over a longer time constant—but is more influenced by received signal preceding the packet that is being decoded.

Instead of duplicating components between filters 15 and 16, filter 15 could be implemented by providing an averaging unit equivalent to unit 152 that instead averages the last N values stored in maximum and minimum store sections 167 and 168.

Filter 17 comprises two first order IIR (infinite impulse response) filters 171, 172, a control unit 173, an averaging unit 174 and a difference unit 175. Filter 17 receives the output 169 of filter 16, the signal at 27 indicating that synchronisation has been achieved. The control unit activates the filters 171 and 172 when the signal at 27 indicates that synchronisation has been achieved. Then the control unit initialises the filters 171, 172 by setting their initial values to the estimate of the frequency error as output at 169 from filter 16. The difference unit 175 determines the difference between the instantaneously detected received frequency and the nominal frequency. The difference determined at the moment when each '0' bit is detected according to the symbol timing recovery block 22 is applied to IIR filter 171. The difference determined at the moment when each '1' bit is detected is applied to IIR filter 172. Thus filter 171 averages the frequency offsets that correspond to the detection of '0' bits whilst filter 172 averages the frequency offsets that correspond to the detection of '1' bits. The outputs of these filters are averaged by averaging unit 175 to form the output 176 of filter 172 which represents an estimate of the frequency error.

The initialisation of the values for filters 171, 172 can be performed in a number of ways. In one method, the IIR filter estimating the positive frequency deviation is initiated with the average of the M maxima values while the IIR filter estimating the negative frequency deviation is initiated with the average of the M minima values. Alternatively, the IIR filter estimating the positive frequency deviation can be initiated with the frequency error plus an assumed frequency deviation while the IIR filter estimating the negative frequency deviation can be initiated with the frequency error minus an assumed frequency deviation. The assumed frequency deviation may be determined based on the modulation scheme.

The difference units illustrated separately as 150, 160 and 173 could be implemented as a single unit.

In operation of the receiver the filters 15 and 16 operate continuously to provide up-to-date estimates at 159 and 169 of the frequency error. Filter 17 is activated when synchronisation is achieved for the packet currently being received, and otherwise filters 171 and 172 provide no output.

The estimates generated by filters 15 and 17 at 159 and 176 respectively are applied to multiplexer 28. Multiplexer 28 is switched by the signal at 27 indicating that synchronisation has been achieved. The output of multiplexer 28 provides the control input at 20 to the frequency compensator 18. Before synchronisation has been achieved for the present packet multiplexer 28 provides the signal from filter 15 at 159 as the control signal to the frequency compensator 18. When synchronisation has been achieved the multiplexer provides the signal from filter 17 at 176 as the control signal to the frequency compensator.

The control signal to the frequency compensator 18 indicates an estimated offset of the centre frequency of the received signal from the nominal carrier frequency. The frequency compensator applies a corresponding correction to the signal at 13.

Figure 3:
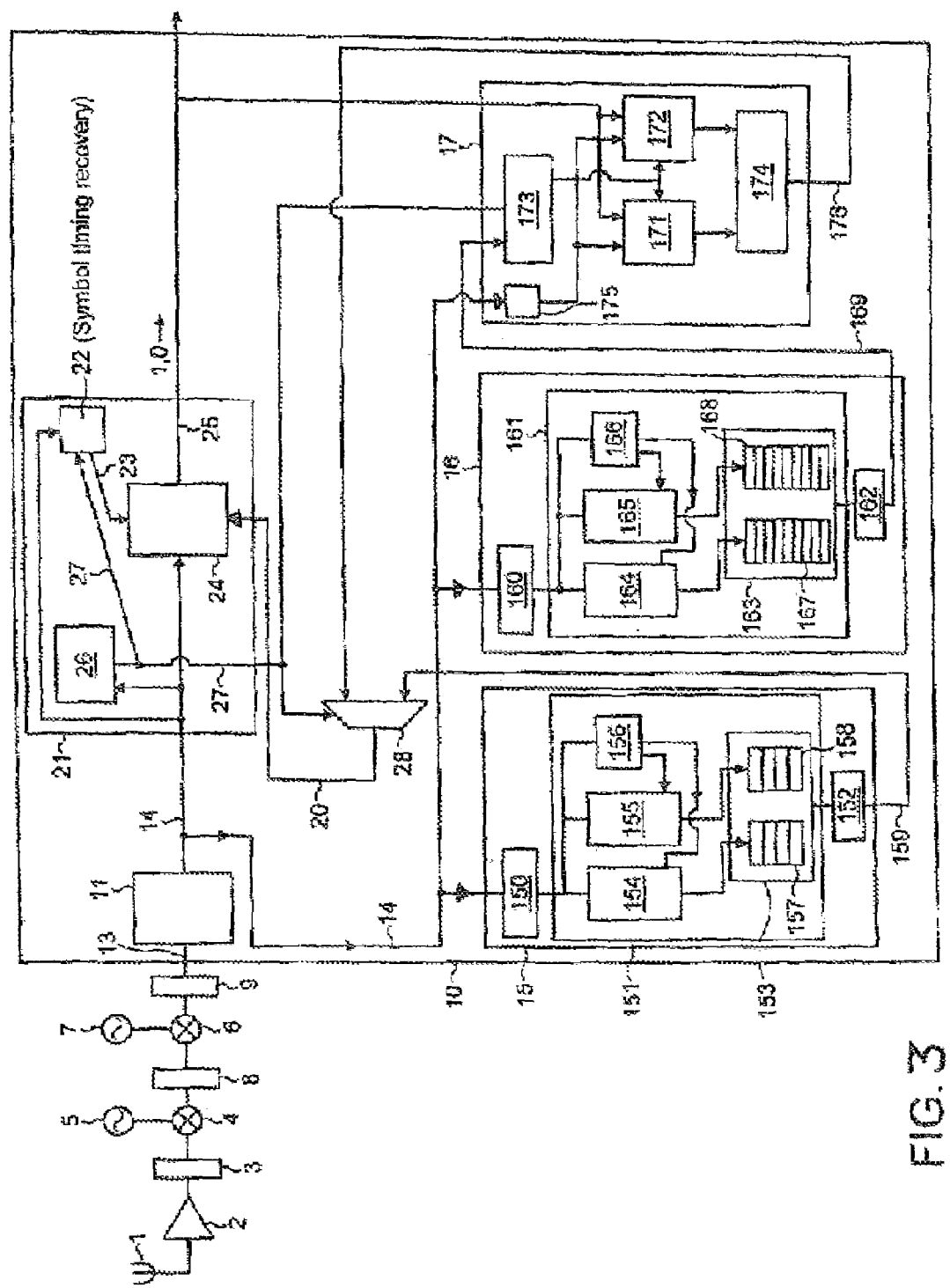
FIG. 3 is a schematic diagram of a radio receiver according to another embodiment of the present invention.

Instead of applying a shift to the detected frequency of the incoming signal after the signal's frequency has been detected other methods could be used. For example, the frequency thresholds used by symbol estimator 24 could be shifted in opposite correspondence to the shift that would be applied to the incoming signal; in that case the output 20 would be applied to symbol estimator 24 and the frequency compensator 18 could be omitted, as shown in FIG. 3.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

What is claimed is:

1. Frequency offset estimation apparatus for estimating the offset from a predetermined nominal carrier frequency of an input signal carrying a plurality of frequency shifted symbols, the apparatus comprising:

a demodulator for demodulating the input signal to estimate the symbols;

a first filter for forming a first estimate of the offset by determining the average of a first predetermined number of each of the last maxima and last minima of the instantaneous frequency difference between the input signal and the nominal carrier frequency;

a second filter for forming a second estimate of the offset by determining the average of the values of the instantaneous frequency difference between the input signal and the nominal carrier frequency associated with the estimation by the demodulator of symbols in the input signal; and a selector for selecting the first estimate or the second estimate as an output estimate of the frequency error.

2. Frequency offset estimation apparatus as claimed in claim 1, wherein the first predetermined number is 2, 3, 4 or 5.

3. Frequency offset estimation apparatus as claimed in claim 1, wherein the second filter comprises:

a first infinite impulse response filter for determining a first average of the values of the instantaneous frequency difference between the input signal and the nominal carrier frequency associated with the estimation by the demodulator of symbols in the input signal having positive frequency shifts;

a second infinite impulse response filter for determining a second average of the values of the instantaneous frequency difference between the input signal and the nominal carrier frequency associated with the estimation by the demodulator of symbols in the input signal having negative frequency shifts; and an averaging unit for determining the average of the first average and the second average.

4. Frequency offset estimation apparatus as claimed in claim 1, comprising a third filter for forming a third estimate of the offset by determining the average of a second predetermined number of each of the last maxima and last minima of the instantaneous frequency difference between the input signal and the nominal carrier frequency; and wherein the second filter is arranged to take the third estimate as an initialisation value for the first and second infinite impulse response filters.

5. Frequency offset estimation apparatus as claimed in claim 4, wherein the second predetermined number is greater than the first predetermined number.

6. Frequency offset estimation apparatus as claimed in claim 1, wherein on receipt of a burst of data the demodulator is arranged to synchronise to the input signal and provide a synchronisation signal indicating whether synchronisation has been achieved.

7. Frequency offset estimation apparatus as claimed in claim 6, wherein the second filter is responsive to the synchronisation signal indicating that synchronisation has been achieved to initialise the first and second infinite impulse response filters.

8. Frequency offset estimation apparatus as claimed in claim 4, wherein the selector is responsive to the synchronisation signal to select the first estimate if the synchronisation signal indicates that synchronisation has not been achieved and to select the second estimate if the synchronisation signal indicates that synchronisation has been achieved.

9. Frequency offset estimation apparatus as claimed in claim 1, wherein the demodulator comprises:

a sensor for sensing the instantaneous frequency of the input signal and generating a sensed frequency signal representing the sensed frequency;

a frequency shifting arrangement for receiving the sensed frequency signal and forming a frequency shifted signal representing the sensed frequency shifted by an amount corresponding to the output estimate of the frequency error; and a symbol estimator for estimating the symbols in the frequency shifted signal.

10. Frequency offset estimation apparatus as claimed in claim 1, wherein the demodulator comprises:

a symbol estimator for estimating the symbols in the input signal by comparing the instantaneous frequency of the incoming signal with a plurality of frequency thresholds; and a threshold frequency shifting arrangement for shifting the thresholds by an amount corresponding to the output estimate of the frequency error.

11. A radio signal receiver comprising:

frequency offset estimation apparatus as claimed in claim 1;

an antenna for receiving a radio frequency signal; and downconversion means for downconverting the radio frequency signal to an intermediate frequency or baseband to form the input signal.

* * * * *